United States Patent [19]

Willinger

[11] 3,927,447
[45] Dec. 23, 1975

[54] TIRE RASP
[75] Inventor: Karl Willinger, Vienna, Austria
[73] Assignee: Firma Hans Ehgartner, Vienna, Austria
[22] Filed: Oct. 3, 1974
[21] Appl. No.: 511,619

[30] Foreign Application Priority Data
Oct. 5, 1973 Austria .............................. 8525/73
Mar. 18, 1974 Austria .............................. 2203/74
Mar. 18, 1974 Austria .............................. 2204/74
May 10, 1974 Austria .............................. 3890/74

[52] U.S. Cl. ........................ 29/79; 29/95; 144/218
[51] Int. Cl.² ..................... B23D 71/00; B23D 1/00
[58] Field of Search ............ 144/218; 29/78, 79, 95

[56] References Cited
UNITED STATES PATENTS

| | | | |
|---|---|---|---|
| 1,889,013 | 11/1932 | Berner | 29/79 |
| 2,975,504 | 3/1961 | Bentham | 29/95 |
| 3,082,506 | 3/1963 | Jensen | 29/79 |
| 3,528,153 | 9/1970 | Walter | 29/79 |
| 3,618,187 | 11/1971 | Jensen | 29/79 |
| 3,831,484 | 8/1974 | Gibb | 144/218 |

Primary Examiner—Harrison L. Hinson
Attorney, Agent, or Firm—Karl F. Ross; Herbert Dubno

[57] ABSTRACT

A rasp for the scraping of worn rubber tires has a generally cylindrical body composed of a multiplicity of blades peripherally adjoining one another, the blades being sandwiched between a pair of end disks held together by an axial bolt and bridged by axially extending rods which traverse at least two mounting holes in each blade. The blades may have a polygonal shape, with three or more toothed sides, overlapping one another so that one toothed side of each blade comes to lie along the periphery of the body to define part of a cutting surface. Additional apertures in the blades serve for the circulation of air therethrough, these apertures being flanked by lugs integral with the blades which are bent out laterally to form spacers therebetween; the end disks may also be apertured to facilitate air cooling of the body. Each blade tooth is bounded by four concave arcuate edges defining three sharp points, the middle point projecting radialy beyond the two flanking points; each tooth, or each pair of adjacent teeth, is symmetrical about a radial line.

28 Claims, 18 Drawing Figures

TIRE RASP

FIELD OF THE INVENTION

My present invention relates to a rasp for the scraping of worn rubber tires preparatorily to recapping, retreading or vulcanization of the carcass.

BACKGROUND OF THE INVENTION

Conventional tire rasps, e.g., as known from U.S. Pat. Nos. 2,703,446, 2,896,309 and 3,082,506, have a generally cylindrical body in which a multiplicity of arcuate sheet-metal blades are sandwiched between a pair of end disks, each blade having a toothed convex side whose radius of curvature substantially corresponds to the radius of the end disks. In the assembled state, these toothed sides come to lie on the periphery of the body to define part of a cutting surface. The blades are held together by mounting means including a central bolt interconnecting the disks and a multiplicity of axially extending rods passing through mounting holes near the ends of each blade. The peripherally aligned blades define a helical ridge whose turns are separated by interposed solid spacers. Upon the detachment of the end disks from each other, worn blades may be removed for replacement by fresh ones.

OBJECTS OF THE INVENTION

The general object of my present invention is to provide an improved blade construction for a tire rasp of this type.

More particularly, my invention aims at providing a set of blades each with three or more toothed sides which can be selectively positioned at the periphery of the rasp body to do the scraping.

Another specific object of my invention is to provide a novel tooth configuration for such blades enabling each working side thereof to be used for a longer period than has been possible with conventional blade teeth.

It is also an object of my invention to provide a set of blades which can be more effectively cooled by an air stream circulating through the rasp body.

SUMMARY OF THE INVENTION

According to a feature of my present invention, each blade tooth is bounded by four concave arcuate edges meeting at three sharp points including a middle point and two flanking points, the middle point projecting radially beyond the flanking points. In use, the middle point is initially effective to scrape the tire, with little or no contribution from the flanking points. As this middle point is worn down to the level of the flanking points, or of the flanking point more distant from the axis of rotation, the point at the leading tooth flank is effective for a further period of use until it, too, has grown dull. Upon reversal of the sense of rotation or of the position of the blade in the rasp body, the other flanking point can be utilized.

To enable indiscriminate use of the blade with either direction of rotation, each tooth may simply be symmetrical about a radial line passing through its middle point. Alternatively, each pair of adjacent teeth may be symmetrical about a radial line passing through the center of curvature of a common arcuate edge interconnecting their confronting flanking points, these latter points lying at a greater distance from the body axis than the oppositely facing flanking points of the pair. Such an arrangement has the advantage that the points of each tooth lie at three different levels so that any lower point is not subjected to appreciable wear until the higher point or points have been worn down.

According to another feature of my invention, each blade has the general shape of a regular polygon with convex sides, preferably a triangle or a square; the several sides are all toothed and are individually positionable at the peripheral surface of the rasp body along which they extend over a fraction of a circle. To form a complete circle, a number of such blades are detachably secured to one another in overlapping relationship at the corners of their polygons; with imbricate mounting, they may be arrayed along a generally helical line, yet I prefer to arrange them in parallel tiers so as to obviate the need for any interposed spacing means.

Pursuant to a further feature of my invention, the blades are provided with venting apertures for the circulation of cooling air; the end disks, advantageously, are also apertured for this purpose. To promote the circulation of air through the rasp body, the apertures of the disks preferably open skew to the body axis in the direction opposite that of rotation on the outer face of at least one disk whereby air is drawn into the body at that disk and exits either radially or at the opposite end. The disk and blade apertures may have a variety of cross-sections, e.g., circular, polygonal or oblong; to prevent the erroneous insertion of mounting rods into the air apertures of the blades, these apertures should have a shape distinct from that of the mounting holes.

Still another feature of my invention resides in the provision of laterally extending lugs integral with the blades serving to keep them axially separated, thereby eliminating the need for interposed spacers whose presence would impede the circulation of air between the blades. In a particularly advantageous construction, the lugs fit into adjoining venting apertures of the blade and are connected therewith along parts of the circumferences of these apertures, each lug being partly severed from the blade by the aparture-forming punch and being then bent out of the plane of the blade — preferably at right angles thereto — so as to come to lie substantially in a radial plane of the rasp body. Such a lug will also act as a vane entraining the air between the axially adjoining blades and setting it in rotation, causing the air to be driven centrifugally outwardly between the blades while entering the body through the end disks.

The above-discussed features may be used individually or in combination, to the extent of their mutual compatibility.

BRIEF DESCRIPTION OF THE DRAWING

The above and other features of my invention will now be described in detail with reference to the accompanying drawing in which.

SPECIFIC DESCRIPTION

Figure 1:
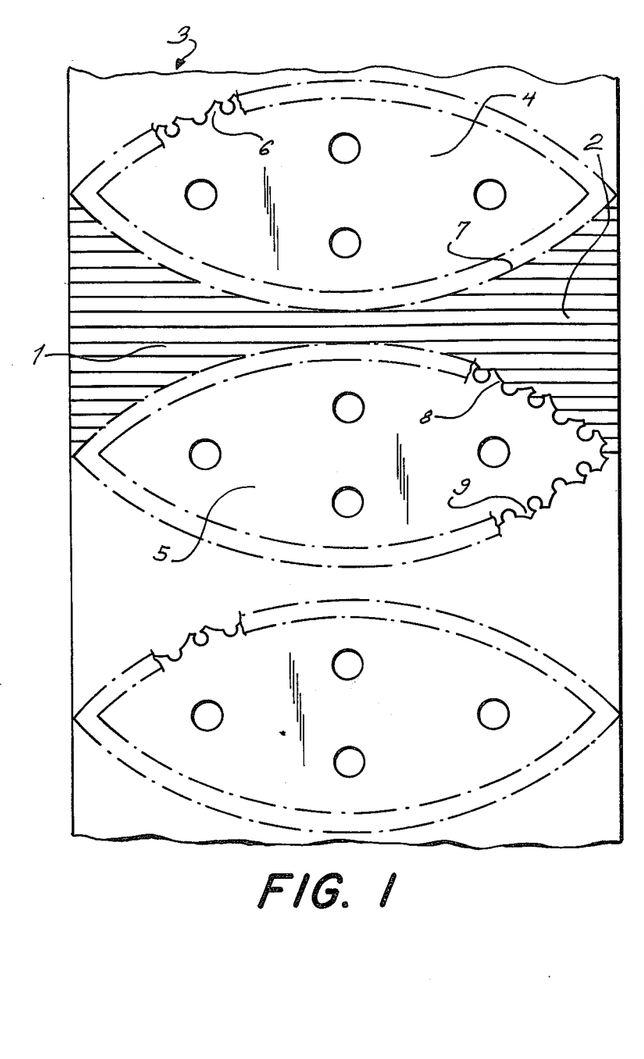
FIGS. 1, 2 and 3 are somewhat diagrammatic views of three types of blades stamped from a strip of sheet metal.

In FIG. 1 I have shown a strip 3 of sheet steel from which a multiplicity of blades 4, 5 etc. are stamped, leaving between them unused strip portions 1. Each blade has a pair of oppositely curved convex sides, as known per se, provided with respective teeth 6, 7 and 8, 9. The shape of these teeth will be discussed in detail hereinafter with reference to FIG. 7.

Figures 2, 3:
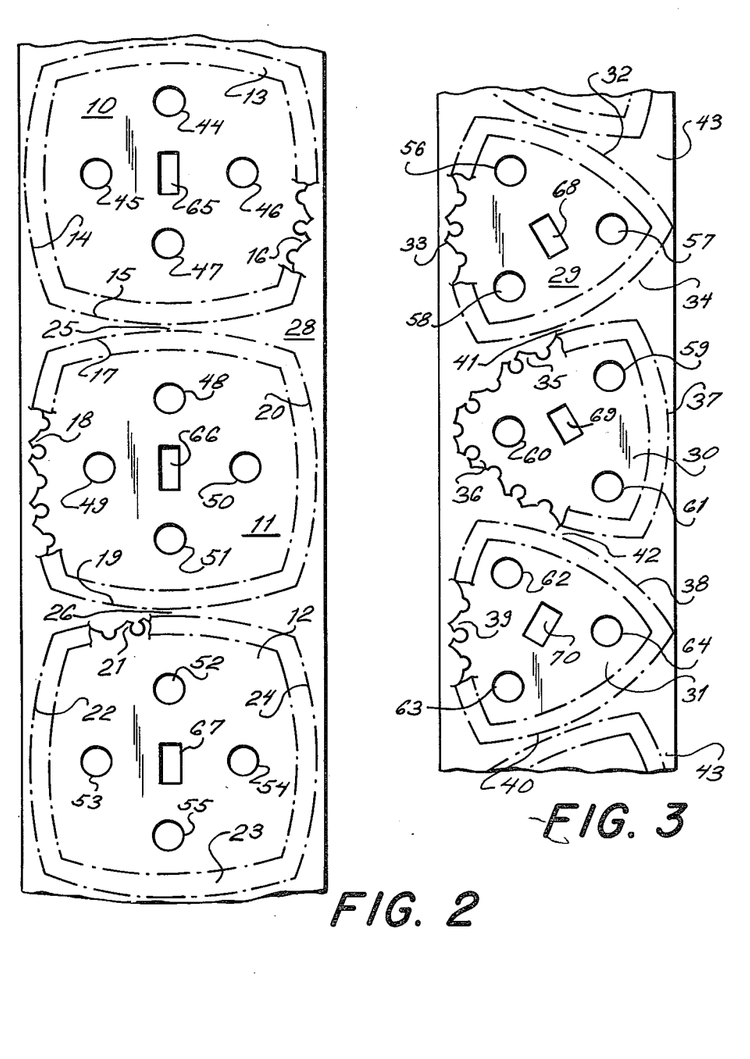

The waste of sheet metal as indicated at 1 in FIG. 1 can be greatly reduced, in accordance with a feature of my invention, by giving the blades a generally polygonal outline approximating either a square (FIG. 2) or an equilateral triangle (FIG. 3). In FIG. 2 I show a sheet-steel strip 28 with three blades 10 – 12 cut therefrom, these blades having four convex and toothed sides 13 – 16, 17 – 20 and 21 – 24, respectively. Only narrow unused zones 25, 26 remain between adjacent blades.

Similarly, three generally triangular blades 29 – 31 cut from a strip 43 in FIG. 3 are separated by narrow zones 41 and 42. Each of the blades 29 – 31 has three toothed, convex sides 32 – 34, 35 – 37 and 38 – 40. In will be understood that, in each instance, all the toothed sides of any blade to be assembled into a rasp have the same radius of curvature, corresponding to the radius of the substantially cylindrical rasp body as shown, for example, in FIG. 11 discussed hereinbelow.

Each of the blades of FIG. 2 is provided with four angularly equispaced mounting holes 44 – 47, 48 – 51 and 52 – 55. These mounting holes are disposed next to the midpoints of the respective polygon sides and are clustered about a central key slot 65, 66 or 67.

In an analogous manner, the blades of FIG. 3 are formed with respective sets of three mounting holes 56 – 58, 59 – 61 and 62 – 64 which are disposed at the corners thereof; central key slots 68, 69 and 70 are again provided.

Figure 9:
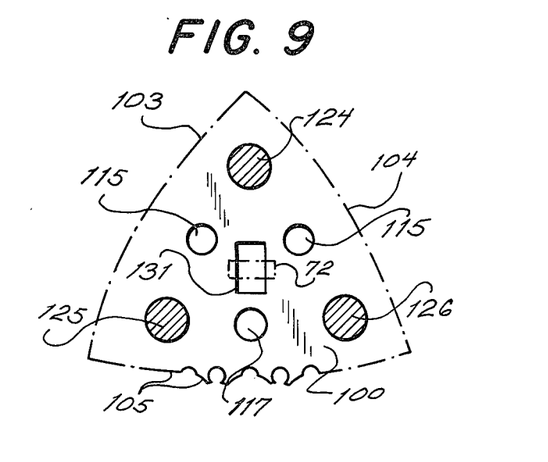
Figure 10:
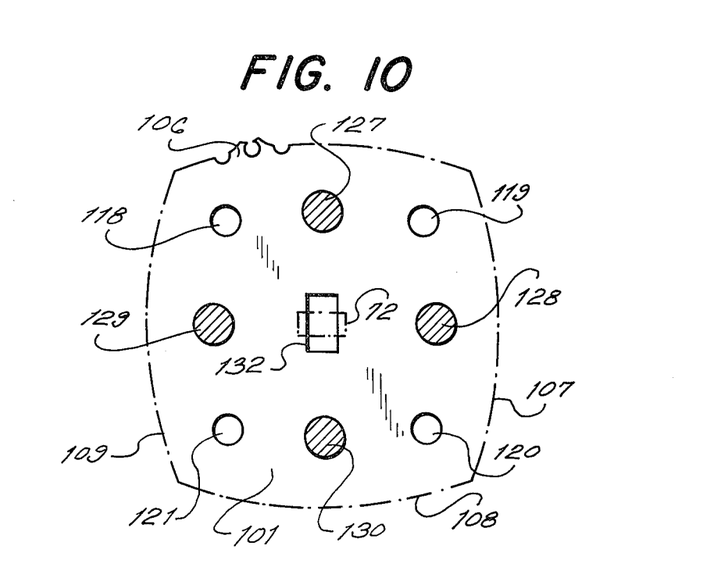

In the assembly of the blades, the mounting holes are traversed by axially extending rods as described hereinafter with reference to FIGS. 4A, 4B and 8 – 10. The key slots 65 – 70 are engageable by a tool 71 (FIG. 5) terminating in a transverse foot 73 which clears these slots and holds a multiplicity of blades 75 together in a stack 74 on being rotated through 90°, as illustrated in FIGS. 9 and 10. The tool 71 has a carrying handle 72 to facilitate transportation of the stack; the blades 75 are temporarily separated in the stack by spacing disks 27.

Figures 4A, 4B, 4C:
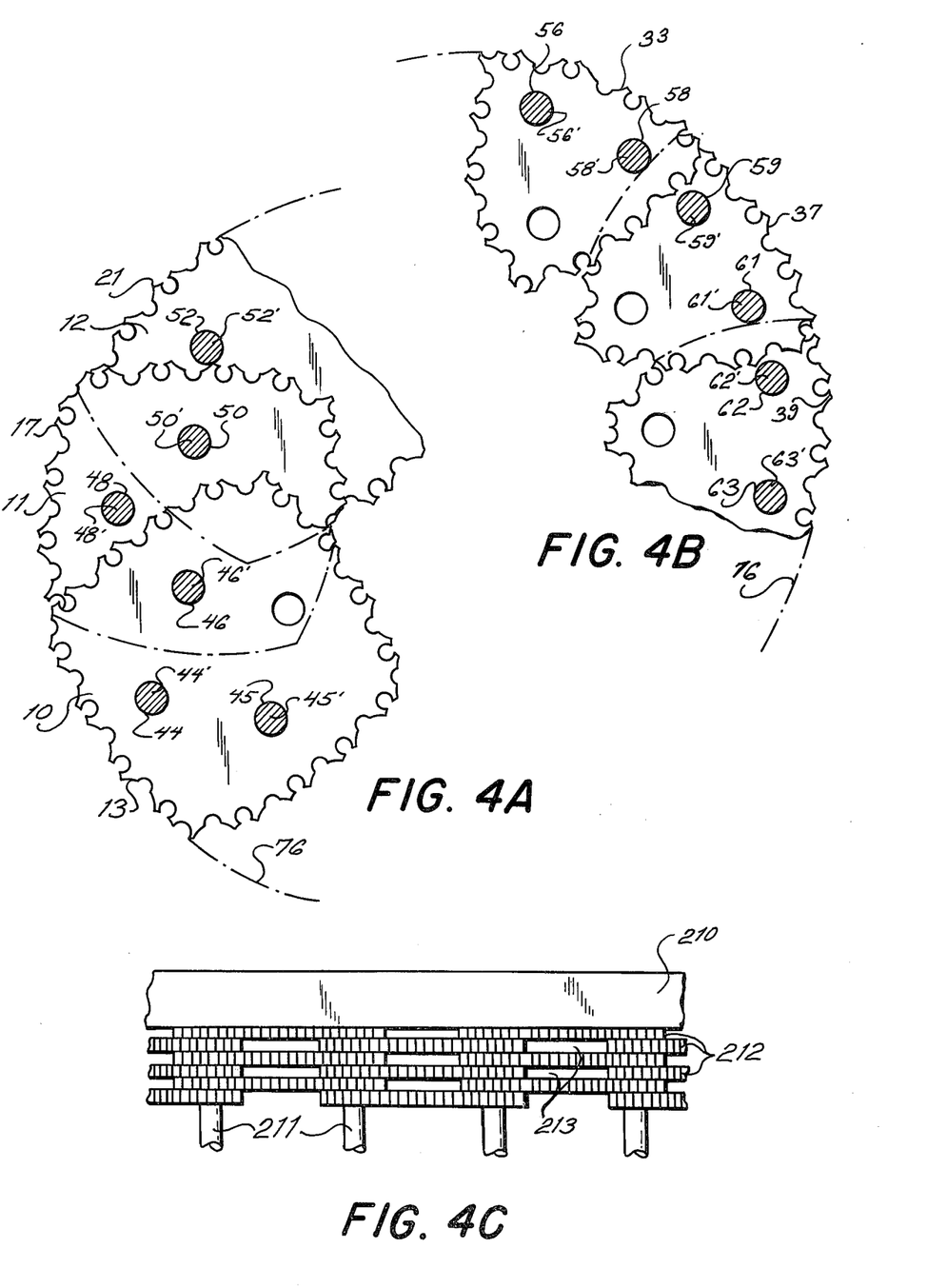
FIGS. 4A and 4B are face views of an array of overlapping blades of the type shown in FIGS. 2 and 3, respectively, centered on the axis of a cylindrical rasp body.
FIG. 4C is a developed side view of part of a multi-tiered rasp body with blades overlappingly arrayed as shown in FIGS. 4A or 4B.
Figure 5:
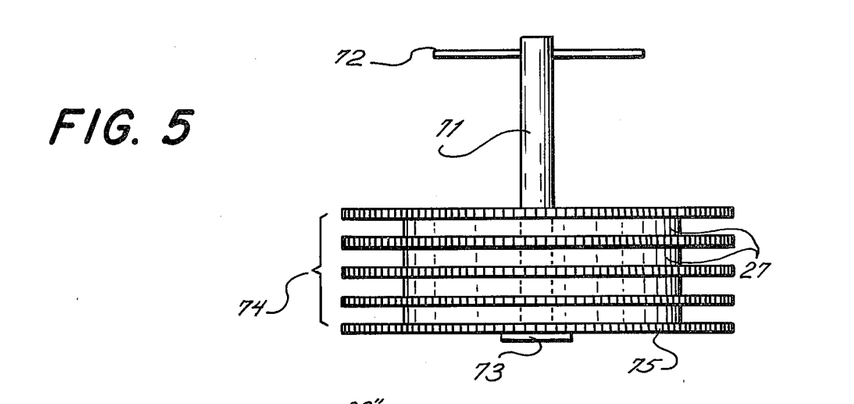
FIG. 5 is a side view of a stack of blades temporarily mounted on a common support.

FIG. 4A shows the blades 10, 11, 12 of FIG. 2 disposed in overlapping relationship along the cylindrical periphery 76 of a rasp body not otherwise illustrated. In the selected blade position shown, sides 13, 17 and 21 of these blades are operatively disposed at the periphery 76. Mounting holes 44, 48 and 52 adjacent these working sides are traversed by respective rods 44', 48' and 52'; other rods 45', 46' and 50' pass through holes 45, 46 and 50 of blades 10 and 11; holes 46 and 50 register with holes 49 and 53 (FIG. 2), respectively, of neighboring blades 11 and 12 overlapped thereby. In this manner, each blade is fixed in position by three mounting rods passing through all but one of its four mounting holes.

FIG. 4B shows the blades 29, 30 and 31 of FIG. 3 arrayed in a similar overlapping relationship but without registering mounting holes. In this instance, the blades are selectively positioned with their toothed sides 33, 37 and 39 lying at the periphery 76 of the rasp body; the adjacent mounting holes 56, 58, 59, 61, 62 and 63 are traversed by respective rods 56', 58', 59', 61', 62' and 63'. Here, too, all but one of the mounting holes of each blade are engaged by respective rods to secure the blade in position.

In the developed view of FIG. 4C I have shown part of a rasp body including an end disk 210, a set of axially extending mounting rods 211 and a multiplicity of mutually overlapping blades 212 traversed by these rods. The blades could be of various shapes, including that of FIG. 1; spaces 213 formed therebetween facilitate the flow of cooling air through the rasp body. The blades 212, the disk 210 and its nonillustrated mate may be provided with venting apertures as more fully described hereinafter with reference to FIGS. 8 – 16.

Figure 6:
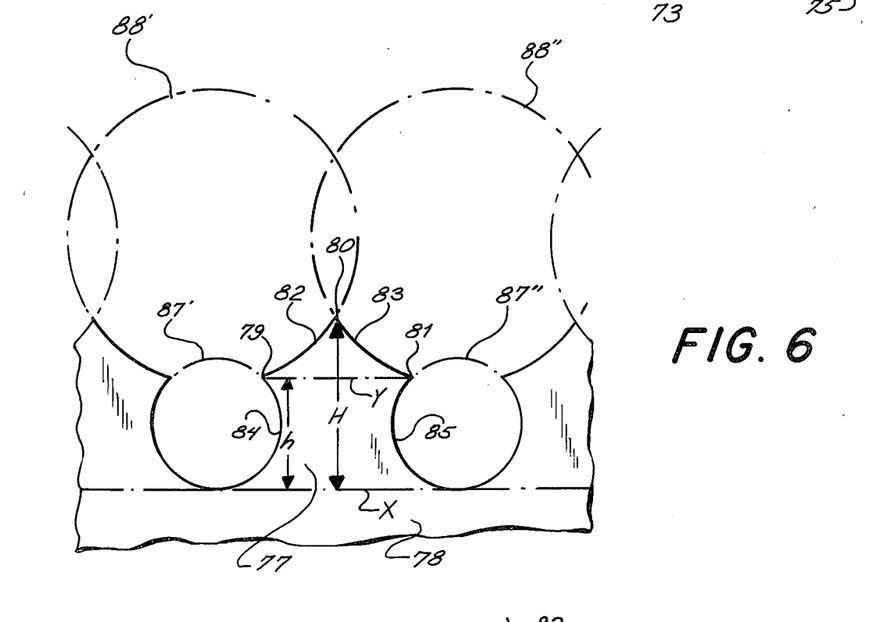
FIGS. 6 and 7 are fragmentary views of a toothed blade portion, drawn to a larger scale and showing two different tooth configurations according to my invention.

FIG. 6 shows part of a blade 78 with symmetrically shaped teeth 77. Each tooth is bounded by four concave edges 82 – 85 meeting at three sharp points 79, 80 and 81; edges 82 and 83 are arcs of two large-diameter circles 86', 86" whereas edges 84 and 85 are arcs of two small-diameter circles 87' and 87". The middle point 80 has the greatest distance from the center of curvature of the toothed blade side, and therefore from the rasp axis; the radius of curvature is so large, on the scale used in FIGS. 6 and 7, that the relative inclination of adjacent teeth 77 has not been indicated. Flanking points 79 and 81 are equidistant from the axis, the height H of middle point 80 (as measured from the root circle $x$ of the teeth) exceeding the corresponding height $h$ of flanking points 79 and 81 by, say, 1 mm. When the center of the tooth has been worn down to the level $y$ linking the flanking points 79 and 81, either of these points — depending upon the direction of rasp rotation — becomes effective. It will be noted that the points 79 and 81 are considerably sharpened by the foreshortening of the tooth 77 so that they may have more of a cutting than of an abrading effect, with lower heat development and reduced dust generation.

Arcuate edges 84 and 85 are tangent to the root circle $x$ and are common to flanking points of adjoining teeth confronting the points 79 and 81. These edges are shown to extend over about three-quarters of a circle.

Figure 7:
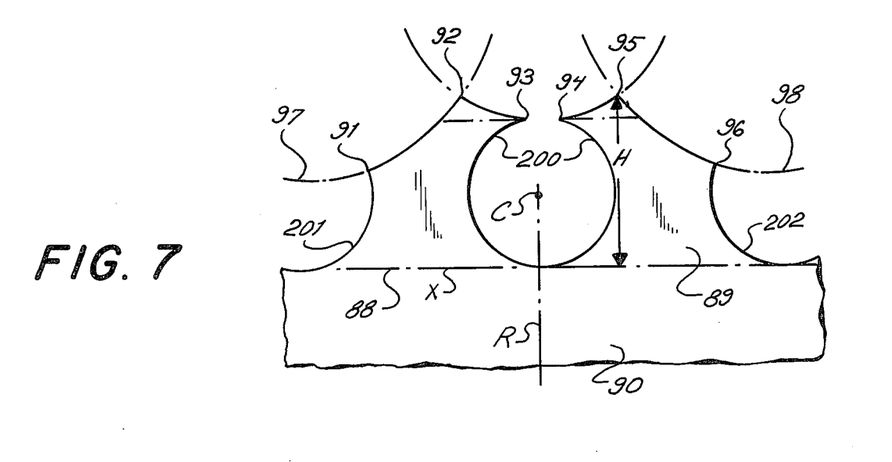

While the tooth shape of FIG. 6 could be used on any of the blades illustrated in the preceding as well as subsequent Figures, the actual shape shown in FIGS. 1 – 3, 4A, 5A, 8 – 10 and 12 corresponds to that of FIG. 7 in which a blade portion 90 is formed with a multiplicity of pairs of adjacent teeth 88, 89 which are mirror-symmetrical about a radial line R passing through the center of curvature C of a common arcuate edge 200 interconnecting confronting flanking points 93 and 94 of teeth 88 and 89. The distance of these points 93 and 94 from the root circle $x$ is somewhat greater than the distance $h$ in FIG. 6 but smaller than the distance H of middle points 92 and 95 from that root circle. The outer flanking points 91 and 95, facing away from each other, lie at a lower level than the points 93 and 94, their distance from root circle $x$ being somewhat less than the distance $h$ in FIG. 6.

In this case, too, each tooth is bounded by four arcuate edges; the edges linking the more closely spaced points 92, 93 and 94, 95 of teeth 88 and 89 lie on a common circle 86 whose radius is substantially larger than that of common edge 200 but smaller than that of two circles 97 and 98 which include the edges interconnecting points 91, 92 and 95, 96, respectively. Points 91 and 95 are connected to corresponding points of neighboring tooth pairs, not shown in FIG. 7, by arcuate edges 201, 202 having about the same radius of curvature as the edge 200. It will be noted that edge 200 extends over an arc substantially exceeding three-quarters of a circle whereas the arcs of edges 201 and 202 are only slightly greater than a semicircle. In both FIGS. 6 and 7 the distance H of the middle point from the root of the tooth exceeds twice the radius of curvature of common arcuate edges 84, 85 and 200 – 202.

Alternate teeth 77 (FIG. 6) or 88, 89 (FIG. 7) can be set in opposite directions, with reference to the plane of the blade, as is well known per se.

With the tooth configuration of FIG. 7 the points 92 and 95 go first into action until they are worn down to the level of points 93 and 94. These latter are particularly sharp and operate virtually alone, with corresponding directions of rotation, until they have come down to the level of points 91 and 96 which then supplement their scraping action. It will be convenient to change the direction of rotation (or to reverse the position of the blades in the rasp) at frequent intervals for a more or less uniform wearing of the two teeth of each pair.

Figure 8:
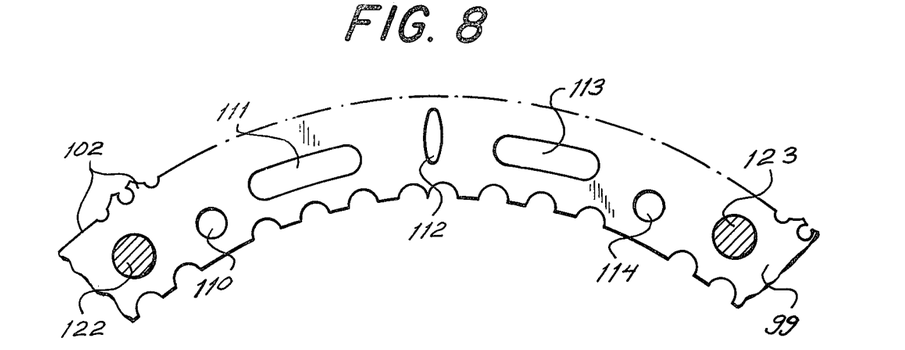
FIGS. 8 – 10 are face views of individual blades according to the invention.

FIG. 8 shows a segmental blade 99 with only one convex and toothed side 102 and with a pair of mounting holes traversed by bolts 122 and 123. Additional apertures 110 – 114 serve for the circulation of cooling air therethrough, these apertures having a shape different from that of the mounting holes so as to prevent the inadvertent insertion of a mounting rod into any of them.

Similarly, as shown in FIG. 9, a generally triangular blade 100 of the type discussed with reference to FIGS. 2 and 4B has mounting holes traversed by rods 124 – 126 and additional apertures 115 – 117, of smaller diameter, near the midpoints of its toothed sides 103 – 105; these apertures 115 – 117 are also equidistantly clustered about a key slot 131.

FIG. 10 shows a four-sided blade 101 of generally square configuration, similar to those illustrated in FIGS. 2 and 4A, with mounting holes traversed by bolts 127 – 130 and venting apertures 118 – 121 at the corners defined by its toothed sides 105 – 109; a key slot is shown at 132.

The venting apertures shown in FIGS. 8 – 10 not only help maintain the working temperature of the rasp at a tolerable level, e.g., of not more than 300°C, but also minimize the thermal deformation of the blade during tempering. The blades therefore remain essentially flat and can be more easily clamped in the body of the rasp.

Figure 11:
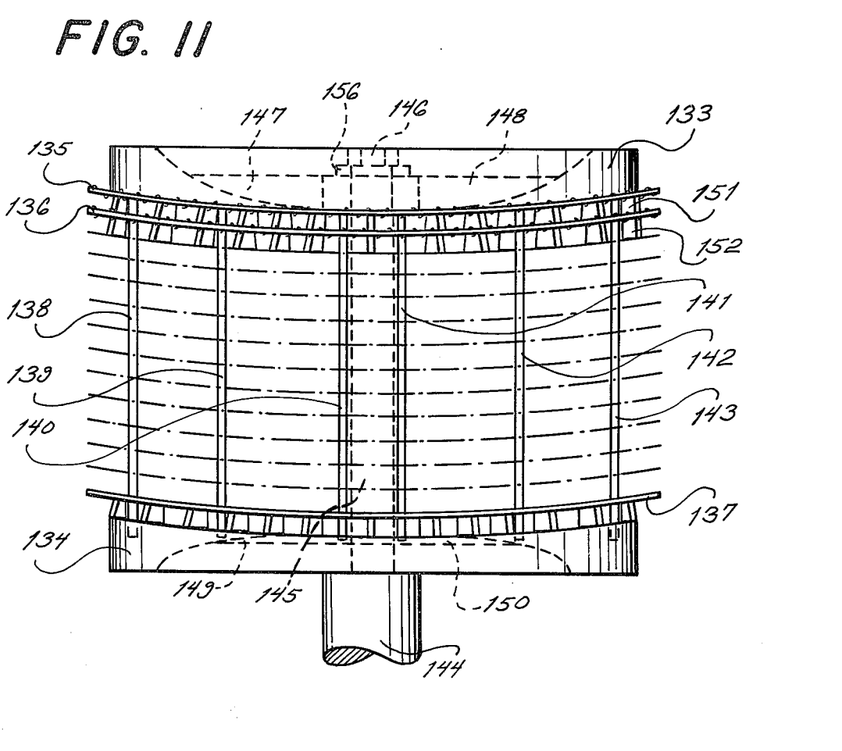
FIG. 11 is a somewhat diagrammatic side-elevational view of a tire rasp according to my invention.

Such a rasp has been illustrated in FIG. 11 and is seen to comprise a pair of end disks 133, 134 held together by a central bolt 144 whose threaded end is engaged by a nut 156 and a counternut 146 within a recess on the outer face of disk 133. Tiers of blades, some of which have been designated 135, 136 and 137, are held together by axially extending mounting rods 138 – 143 spanning the two disks. If the blades are of segmental shape, as illustrated in FIGS. 8 and 12, they may be nonoverlappingly juxtaposed within each tier to form a ring; in principle, however, any of the blade configurations discussed above may be used, with or without overlapping.

The blades of several tiers are held axially separated by spacers 151, 152 in the form of transverse lugs, integral with these blades, as more fully described below with reference to FIG. 12. The presence of these lugs insures the maintenance of clearances between the blade tiers through which cooling air may freely circulate. End disks 133 and 134 are formed with apertures 147, 148 and 149, 150, in any of the shapes described hereinafter with reference to FIGS. 13 – 16, through which ambient air can be drawn into the rasp body for radial expulsion therefrom through the inter-tier clearances under the action of a centrifugal force due to rotary entrainment of the air volume in those clearances by the spacing lugs 151, 152. These spacing lugs should therefore be oriented, substantially, in radial planes of the rasp body as likewise shown in FIG. 12.

It will be noted that disk 133 has a cylindrically convex inner face adjoining the tier 135 and that disk 134 has a complementarily concave inner face adjoining the tier 137. The stack of spaced blades sandwiched between these disks, therefore, is similarly curved so that each tier thereof assumes an undulating shape. This is advantageous since it distributes the scraping action of the teeth over the entire workpiece area contacted by the rasp.

Figure 12:
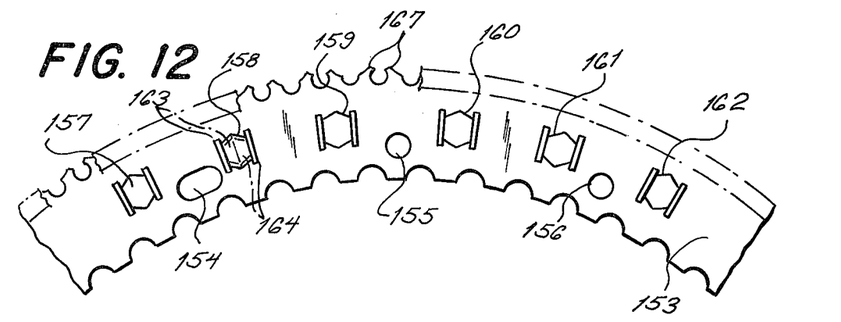
FIG. 12 shows, in face view, part of a blade included in the rasp of FIG. 11.

In FIG. 12 I have shown part of a segmental blade 153 with mounting holes 154 – 156, the first of them somewhat elongated to allow for manufacturing tolerances, and venting apertures 157 – 162 of hexagonal configuration. Each of these venting apertures is flanked by a pair of spacing lugs 163, 164 which are integral with blade 153 and are of trapezoidal shape substantially corresponding to half the hexagonal outline of the aperture bracketed thereby as particularly indicated in dot-dash lines for the apertures 158. The lugs of each pair are connected with the blade body on opposite sides of the hexagon, having been partly severed from the sheet-metal strip and separated from each other in the aperture-forming process; they are then bent out of the plane of the blade to come to lie in respective radial planes.

Figure 13:
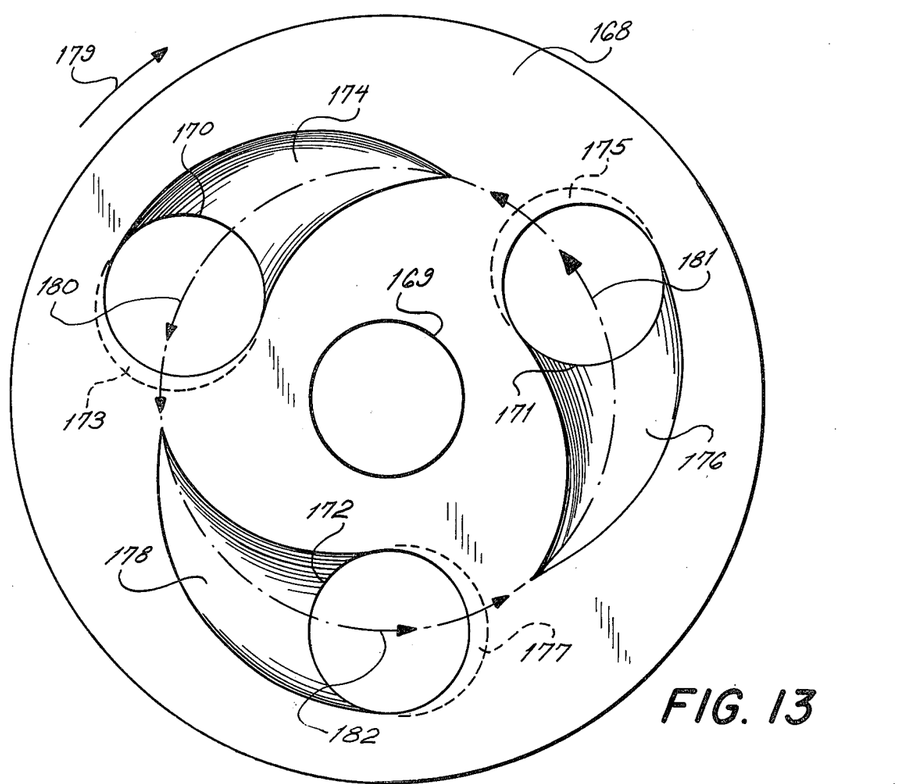
FIG. 13 is a face view of an end disk forming part of a rasp according to my invention.

FIG. 13 shows an end disk 168 with a central bore 169 for the bolt 144 of FIG. 11. Disk 168, designed to rotate clockwise as indicated by an arrow 179, has three apertures 170 – 172 angularly equispaced about its axis; the inlet ends of the apertures form invertedly funnel-shaped troughs 174, 176, 178 tapering in the direction of rotation at the outer disk faces. These troughs guide the surrounding air into the apertures 170 – 172 as indicated by arrows 180 – 182, the air streams being deflected inwardly by the slightly overhanging trailing edges 173, 175, 177 of the aperture mouths which are centered on axes skew to that of disk 168.

Figure 14:
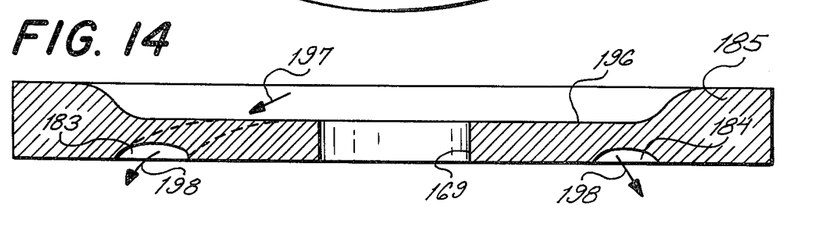
FIG. 14 is a cross-sectional view of a modified end disk.

As illustrated in FIG. 14, a disk 184 provided with a central recess 196 has a pair of diametrically opposite apertures 183 and 184 curving along substantially helical lines about the disk axis so as to form inclined channels for the intake of air as indicated by arrows 197, 198. Again, the axes of the aperture mouths are skew to the disk axis.

Figure 15:
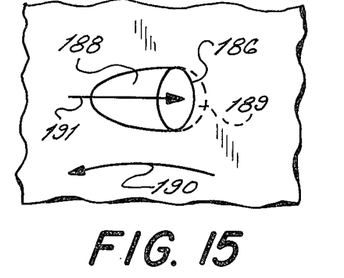
FIGS. 15 and 16 are fragmentary face views of an end disk, showing different aperture configurations.

FIG. 15 shows part of a disk surface with an intake aperture 186 terminating in an ovoidal inlet 188 which takes the place of troughs 174, 176, 178 of FIG. 13; with the disk rotating counterclockwise as indicated by an arrow 190, air is again scooped up by the overhanging trailing edge 189 as symbolized by an arrow 191.

Figure 16:
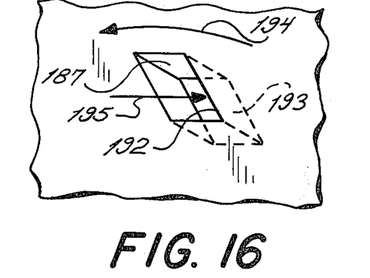

In FIG. 16 the disk, also rotating counterclockwise as indicated by arrow 194, has an aperture 193 of prismatic configuration with an entrance end 187 whose overhanging edge 192 scoops up the air to generate an inward flow symbolized by an arrow 195.

I claim:

1. A tire rasp comprising a generally cylindrical body with a pair of end disks and a multiplicity of sheet-metal blades sandwiched between said disks, each of said blades having at least one toothed side circularly curved with a common radius substantially equaling that of said disks, said blades adjoining each other with said toothed sides thereof centered on the axis of said body to define part of a peripheral cutting surface; the teeth of said blades being each bounded by four concave arcuate edges meeting at three sharp points including a middle point and two flanking points, said middle point projecting radially beyond said flanking points.

2. A tire rasp as defined in claim 1 wherein confronting flanking points of adjoining teeth are interconnected by a common arcuate edge with a radius of curvature substantially smaller than the radii of curvature of the edges interconnecting the flanking and middle points of each tooth.

3. A tire rasp as defined in claim 2 wherein each tooth is symmetrical about a radial line passing through said middle point.

4. A tire rasp as defined in claim 2 wherein the teeth of each blade are divided into pairs of adjacent teeth symmetrical about a radial line passing through the center of curvature of said common arcuate edge thereof.

5. A tire rasp as defined in claim 4 wherein the confronting flanking points of any pair of adjacent teeth lie at a greater distance from said axis than the oppositely facing flanking points thereof.

6. A tire rasp as defined in claim 5 wherein the common arcuate edge interconnecting said confronting points of any pair of adjacent teeth extend over more than three quarters of a circle, the common arcuate edge of the confronting points of adjoining pairs extending over substantially less than three quarters of a circle.

7. A tire rasp as defined in claim 2 wherein the distance of said middle point from the root of the tooth substantially exceeds twice the radius of curvature of said common arcuate edge.

8. A tire rasp as defined in claim 1 wherein each of said blades has the general shape of a regular polygon with convex sides, each of said sides being toothed and extending over a fraction of a circle with said common radius, said body being provided with mounting means for detachably securing said blades to one another in overlapping relationship at the outermost corners of their polygons, said mounting means enabling positioning of each blade with any side thereof facing outwardly.

9. A tire rasp as defined in claim 1 wherein said blades and said disks are provided with apertures for the circulation of cooling air.

10. A tire rasp as defined in claim 1 wherein said blades are provided with integral lugs laterally projecting therefrom for holding axially adjoining blades separated from one another.

11. A tire rasp comprising a generally cylindrical body with a pair of end disks; a multiplicity of sheet-metal blades sandwiched between said disks, each of said blades having a circularly curved toothed side centered on the axis of said body to define part of a peripheral cutting surface; and mounting means detachably securing said blades to one another and to said disks; said blades and said disks being provided with apertures for the circulation of cooling air; the teeth of said blades being each bounded by four concave arcuate edges meeting at three sharp points including a middle point and two flanking points, said middle point projecting radially beyond said flanking points.

12. A tire rasp as defined in claim 11 wherein said blades are provided with spacing means forming between each pair of axially adjoining blades a clearance communicating with the apertures thereof.

13. A tire rasp as defined in claim 11 wherein said spacing means are lugs integral with said blades.

14. A tire rasp as defined in claim 13 wherein said lugs are connected with said blades along parts of the circumferences of said apertures and bent out of the planes of the blades.

15. A tire rasp as defined in claim 14 wherein said apertures are hexagonal, said lugs being of trapezoidal outline corresponding to half the hexagon of said apertures.

16. A tire rasp as defined in claim 13 wherein said lugs lie substantially in radial planes of said body.

17. A tire rasp as defined in claim 12 wherein one of said disks has an inner face with a cylindrically convex curvature and the other of said disks has an inner face with a complementarily concave curvature, said blades forming undulating tiers axially separated by said spacing means between said inner faces.

18. A tire rasp as defined in claim 11 wherein the apertures of at least one of said disks open skew to said axis in the direction of rotation onto the outer disk face.

19. A blade for a generally cylindrical tool, comprising a sheet-metal member having at least one side circularly curved about an axis and provided with a series of teeth each bounded in the plane of curvature by four concave arcuate edges meeting at three sharp points including a middle point and two flanking points, said middle point projecting radially beyond said flanking points.

20. A blade as defined in claim 19 wherein confronting flanking points of adjoining teeth are interconnected by a common arcuate edge with a radius of curvature substantially smaller than the radii of curvature of the edges interconnecting the flanking and middle points of each tooth.

21. A blade as defined in claim 20 wherein each tooth is symmetrical about a radial line passing through said middle point.

22. A blade as defined in claim 20 wherein said teeth are divided into pairs of adjacent teeth symmetrical about a radial line passing through the center of curvature of said common arcuate edge thereof.

23. A blade as defined in claim 22 wherein the confronting flanking points of any pair of adjacent teeth lie at a greater distance from said axis than the oppositely facing flanking points thereof.

24. A blade as defined in claim 23 wherein the common arcuate edge interconnecting said confronting points of any pair of adjacent teeth extend over more than three quarters of a circle, the common arcuate edge of the confronting points of adjoining pairs extending over substantially less than three quarters of a circle.

25. A blade as defined in claim 20 wherein the distance of said middle point from the root of the tooth substantially exceeds twice the radius of curvature of said common arcuate edge.

26. A blade as defined in claim 20 wherein said member has the general shape of a regular polygon with identically curved convex sides, each of said sides being toothed and extending over a fraction of a circle.

27. A blade as defined in claim 19 wherein said member is provided with apertures for the circulation of cooling air.

28. A blade as defined in claim 19 wherein said member is provided with integral lugs laterally projecting therefrom for holding same separated from an adjoining blade.

* * * * *